May 27, 1969  R. R. BOUCHE  3,446,907
VIBRATION DAMPER

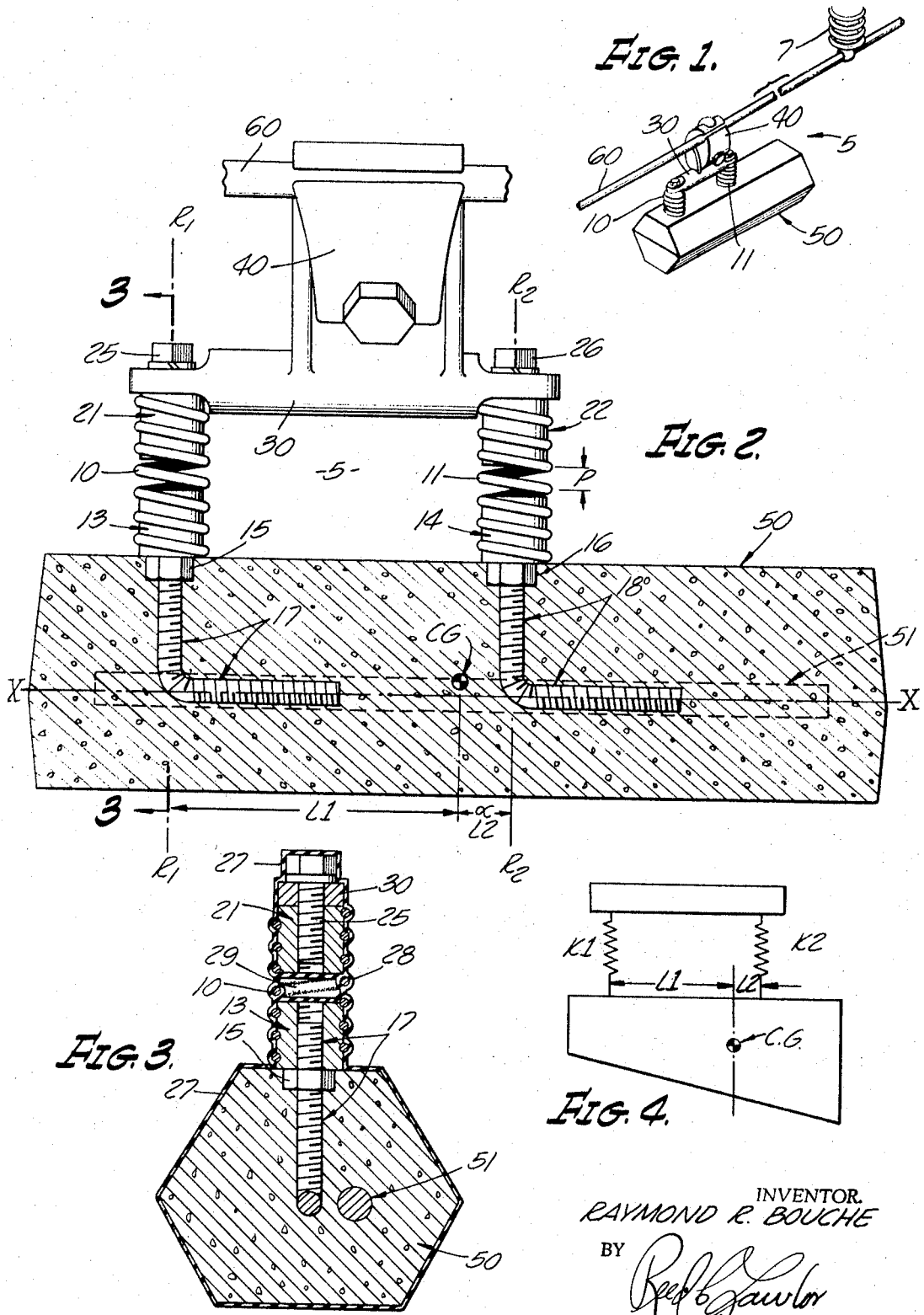

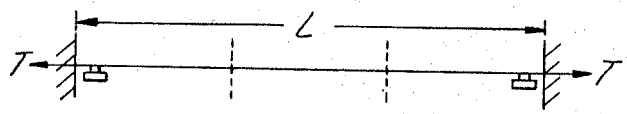
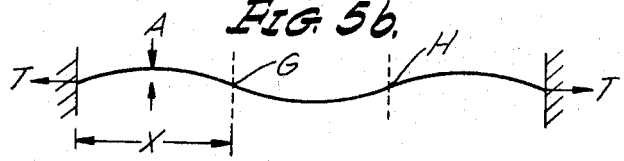
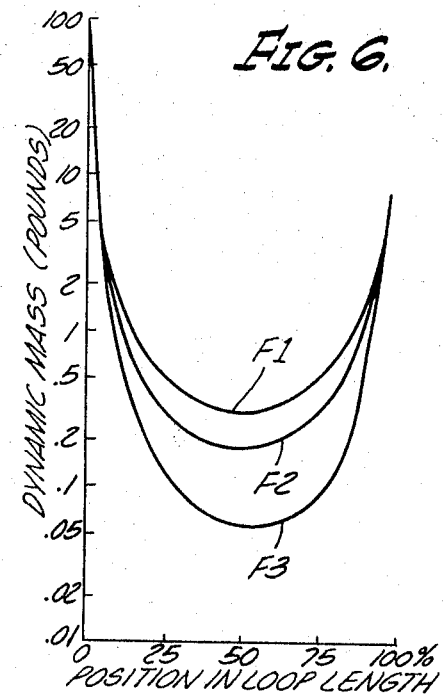
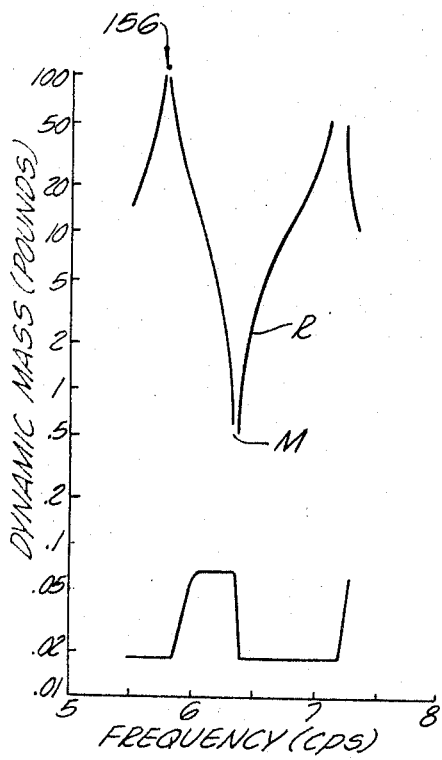
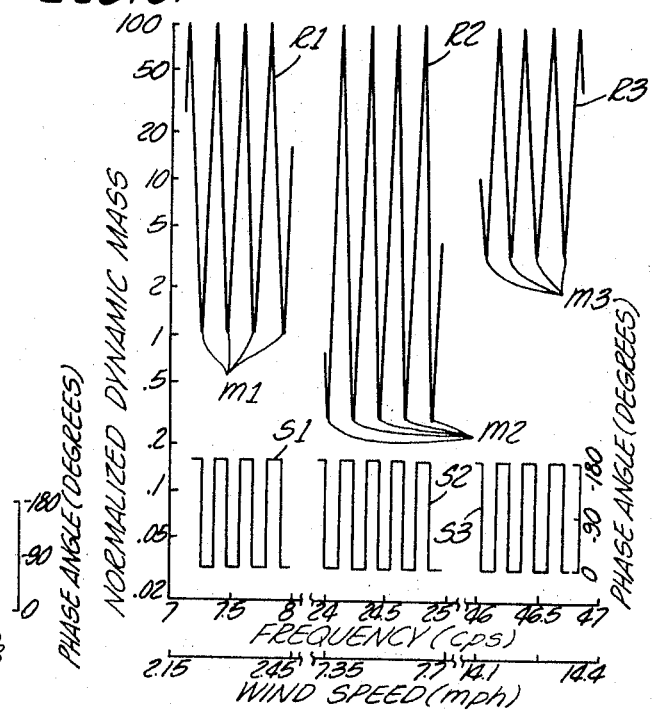

Filed April 10, 1967  Sheet 3 of 3

INVENTOR.
RAYMOND R. BOUCHE
BY Reed Lawlor
ATTORNEY

United States Patent Office 3,446,907
Patented May 27, 1969

3,446,907
VIBRATION DAMPER
Raymond R. Bouche, 4902 Indianola Way,
La Canada, Calif. 91011
Filed Apr. 10, 1967, Ser. No. 629,532
Int. Cl. H02g 7/00, 7/14
U.S. Cl. 174—42
14 Claims

ABSTRACT OF THE DISCLOSURE

Multiple mode dampers for damping Aeolian vibrations of electrical cables are provided, which employ a single mass and two springs. The modes of vibration are made interdependent by utilizing springs having different moments of stiffness with respect to the center of gravity of the mass. The mass is made of concrete. These dampers serve to damp vibrations at many resonant frequencies by making the dynamic mass of the damper large compared with the dynamic mass of the cable at many resonant frequencies simultaneously over a large range of wind speed.

---

This invention relates in general to vibration damping devices and, in particular, to an improved vibration damper for suspended electrical transmission cables and the like.

In a typical suspended cable, Aeolian vibrations are established in the line as a result of the wind flowing past the line. The vibration is caused by vortices which are formed on the leeward side of the line. These vortices alternate in direction, setting up alternating vertical forces, which in turn cause the cable to vibrate, largely in a vertical plane.

The frequency at which the direction these vortices alternates is proportional to the wind velocity and inversely proportional to the diameter of the cable. As the wind speed increases, the frequency of alternation of the vortices increases and also the frequency of the resultant vibrations.

When the frequency of alternation of the vertical forces applied to the line is the same as a resonant frequency of that particular span of cable, the cable will resonate. A particular span of cable will have a large number of resonant frequencies. The resonant frequencies of a particular cable spand depend upon the tension in the cable, the weight per unit length of the cable, and span length. It also depends upon the gravitational constant. The vibration pattern of the line takes the form of a sinusoidal deflection curve with the vibration originating at a clamped end of the span and traveling along the length of the span and back again. Nodes are established at the ends of the span and both loops and nodes between the ends.

As the cable vibrates it flexes at the points at which it is clamped. Such repeated flexing leads to fatigue failure in the cable which may be substantially reduced by the proper design and application of dampers.

The dampers known in the prior art can be divided into two general classes, namely, those which are single-degree-of-freedom dampers and those which are multi-degree-of-freedom dampers.

The basic difference between the two general types of dampers is that single-degree-of-freedom dampers vibrate in a vertical plane in only one mode whereas multi-degree-of-freedom dampers vibrate in a vertical plane in two or more modes.

Single-degree-of-freedom dampers are most effective only for cable resonant frequencies in the range of the single resonant frequency of the damper. In a locality in which the wind speeds varied considerably it is necessary to use several single-degree-of-freedom dampers for each span of cable in order to effectively protect the cable from vibrations throughout a wide range of wind speeds.

Multiple-degree-of-freedom dampers were disclosed by Stockbridge in 1928 in U.S. Patent No. 1,675,391. Since the damper has two or more resonant frequencies, it is effective over a wider range of cable vibration frequencies, and therefore fewer dampers are needed to effectively protect a given span of cable. Dampers similar to the Stockbridge damper were disclosed by Monroe in 1935, Patent No. 1,992,538; by MacIntyre in 1954 in Patent No. 2,688,047; and by Clark in 1962 in Patent No. 3,052,747. In each of these dampers, identical masses are attached to both ends of a spring. The point of attachment is near the center of gravity of the masses. The two resonant frequencies in a vertical plane are achieved because the masses may vibrate naturally about their centers of gravity and also about the points where the centers of the springs act with the mass.

In the present invention, two or more resonant frequencies in a vertical plane are obtained with the use of a single mass and two or more resilient members. This invention resides primarily in the non-symmetrical effect of the resilient members, which may be obtained by non-symmetrical placement of the resilient members, or by the use of resilient members of different stiffnesses, or certain combinations of both.

One of the most difficult problems is to provide a damper which is effective for damping low frequency vibrations in larger cables. Transmission lines with one inch or larger diameter vibrate at wind speeds near and above about 2 miles per hour. In order to provide a damper having a low resonant frequency and which is effective for damping the larger cables, the methods shown in the prior art require the use of heavy masses suspended by relatively soft resilient members. The use of soft resilient members increases the fatigue rate, making it very difficult to design an effective low-frequency damper. The present invention provides a damper which utilizes relatively stiff resilient members but which also has a low resonant frequency and is an effective damper for the low-frequency resonances of large cables.

The resonant frequencies of the damper of the present invention may be determined approximately by theoretical calculations and may be varied by changing the mass and also by adjusting the placement and stiffnesses of the resilient members.

Many of the dampers of the prior art have employed masses of such a design that it would not be feasible to construct the masses from concrete or other non-metallic material. In the present invention, due to the simple design of the mass member it may be made from an inexpensive material, such as concrete.

One object of this invention is to provide a damper with a single inertial or mass element and having two or more resonances in a vertical plane parallel to its longitudinal axis.

Another object of this invention is to provide a damper capable of damping low resonances in heavy cables without failing rapidly.

A further object of this invention is to provide a damper having a single mass or inertial member of relatively simple design in order that the mass or inertial member may be constructed of a low-cost material such as concrete.

In the accompanying drawings, FIGURE 1 represents a perspective view of one embodiment of this invention installed on an overhead transmission line.

FIG. 2 is a partially cut-away front elevational view of one embodiment of this invention;

FIG. 3 is a cross-sectional view taken along the line 3—3 of FIG. 2;

FIG. 4 is a schematic representation used to aid in describing certain aspects of this invention;

FIGS. 5a, 5b, 5c are schematic representation used in describing an equation which is related to this invention;

Figure 9:
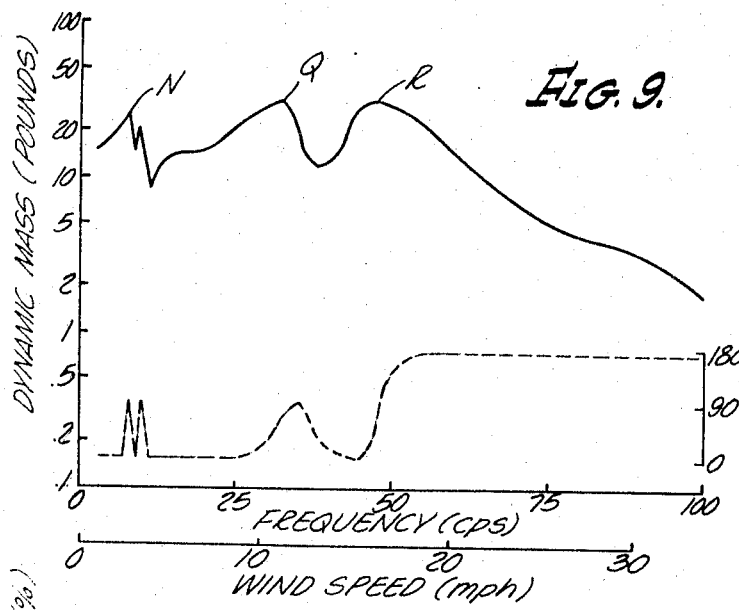
Figure 10:
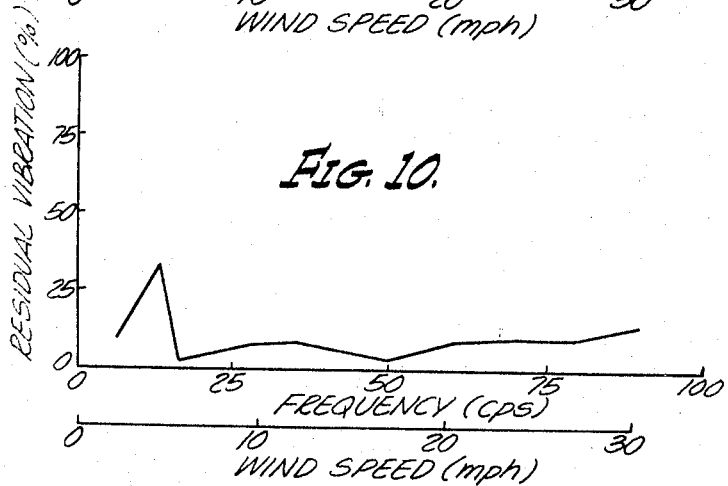
Figure 13:
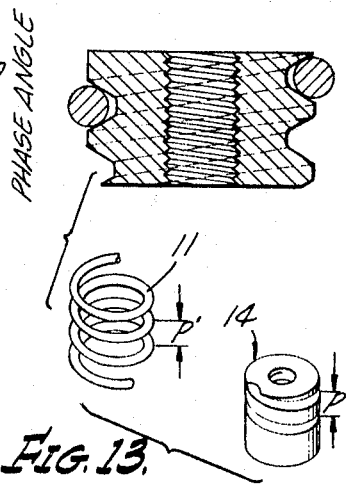
Figure 12:
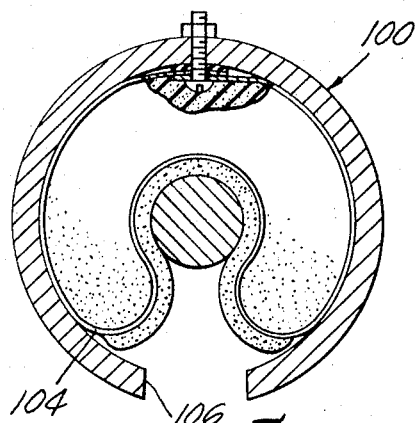
Figure 11:
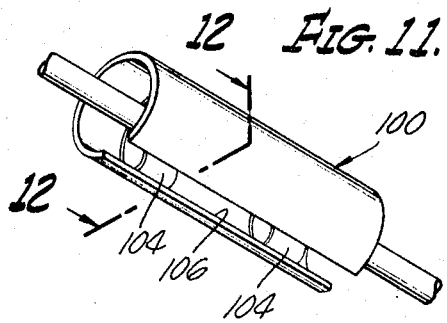

FIGS. 6, 7, and 8 are graphs which demonstrate certain characteristics of the line or cable to which a damper of this invention may be applied;

FIG. 9 is a graph demonstrating certain characteristics of this invention;

FIG. 10 is a graph which demonstrates the effectiveness of one embodiment of this invention;

FIG. 11 is a perspective view of an alternate embodiment of this invention;

FIG. 12 is a cross-sectional view of the embodiment shown in FIG. 11 taken along the line 12—12; and FIG. 13 is an illustration of the spring and holder of 1, 2, and 3 shown disassembled.

Referring to FIG. 1, there is illustrated a vibration damper 5 embodying the invention and mounted on a cable 60 at a point spaced from an insulator 7 from which the cable is suspended. The vibration damper includes a clamp 40 by which the damper is rigidly attached to the cable 60, and an inertial member 50 suspended therefrom by means of two springs 10 and 11.

The vibration damper of this invention possesses two interdependent modes of vibration characterized by two different resonant frequencies. In the embodiment of the invention illustrated, this interdependence is achieved, in part, by employing two springs 10 and 11 having the same stiffness but arranged asymmetrically with respect to the center of gravity CG of the mass member, and, in part, by selecting the various parts to have characteristics such that the dynamic mass of the damper 5 viewed from the clamp 40 is high compared with the dynamic mass of the cable 60 as viewed from the clamp 40, at the resonant frequencies of the cable over a range of wind velocities of concern.

The damper 5 is illustrated in greater detail in FIG. 2. In this embodiment of the invention, the inertial member 50 as shown in FIG. 2 has a uniform crosssection along its longitudinal axis X—X. The longitudinal axis of the inertial member is that axis about which the moment of inertia of the inertial member is a minimum.

A reinforcing rod 51 extends through the inertial member 50 as shown in FIG. 2 and in FIG. 3. The reinforcing rod 51 extends along the direction of the longitudinal axis X—X of the inertial member 50. This reinforcing rod is not connected to any other metal parts of the damper, thus avoiding an electrical conductive loop and concomitant electrical losses.

Due to the relatively simple design of the inertial member 50, it may be formed inexpensively from a material such as concrete.

As indicated in FIGS. 2 and 13, the springs and holder are left-handed. The wire forming the spring is of circular cross-section and the helix of the spring is left-handed. The holder or anchor 14 shown in FIG. 13 is a tubular member designed to be threaded into the end of the helical spring. The diameter of the exterior circumference of the holder is slightly greater than the inner diameter of the spring into which it is threaded. A left-handed helical groove of V-shape is formed in the exterior circumference of the holder with a pitch P slightly different from the pitch P' of the spring to which it attaches. In a practical embodiment of the invention, the anchor pitch P was 0.250 inch and the spring pitch P' was 0.270 inch. This locking mechanism assures good frictional force of the spring on the anchors even when the thread groove of the anchors have dimensions that are slightly less than the inside spring dimensions. This type of anchor or holder serves to prevent stress concentrations in the springs and to prolong spring life.

The inner surface of the holder or anchor 14 has a right-hand thread that is adapted to receive the anchor bolts 17 and 18. The use of left-hand threaded helical springs in conjunction with right-hand threaded bolts provides a natural locking effect upon the holders 13 and 14.

Two threaded angular anchor bolts 17 and 18 are cast into the inertial member 50 with the vertical portion of each anchor bolt positioned along the length of the inertial member 50 at the selected location for the attachment of the springs 10 and 11. The ends of the vertical section of each anchor bolt protrude from the upper surface of the inertial member as shown in FIG. 3, and it is to these ends that the springs 10 and 11 are attached by means of holders or anchors 13 and 14 as shown in FIGS. 2 and 3. Locking nuts 15 and 16 are used to form a tighter fit between the anchor bolts 17 and 18 and the holders 13 and 14 respectively.

When the damper is assembled as shown in FIG. 2, the holders are locked into position by the oppositely threaded parts to which they are attached. Thus, the vibration of the damper would not cause the holders to change position relative to the spring into which it is threaded.

The springs 10 and 11 are connected to a support member 30 by means of holders 21 and 22, respectively, which are similar to the holders 13 and 14. The holders 21 and 22 are attached rigidly to the support member 30 by means of bolts 25 and 26, respectively, which extend through holes drilled in the support member 30. The threaded ends of the bolts 25 and 26 protrude through the support member 30 and receive the holders 21 and 22 respectively. As shown in FIG. 3, an encapsulation or coating 28 covers the springs 10 and 11 and holders 13, 14, 21 and 22. An air cavity 29 may be present since the coating 28 tends to adhere to the metallic surfaces. The covering serves to prevent corrosion and to resist fatigue failure of the springs. The covering to some extent also provides an additional resilience factor in the damper. A suitable covering material for this purpose is silicone rubber, or butyl rubber. In any event, the most suitable material to use for this process is a material having rubber-like characteristics with a durometer hardness between about 40 and about 70.

As shown in FIG. 3, a covering 27 has been applied to the inertial member 50, the springs and holders, and the lower portion of the support member. A suitable covering is neoprene rubber. Such a covering improves the appearance of the damper and serves to resist weathering.

A clamp 40 is part of the support member 30. The clamp 40 as shown in FIG. 2 is disclosed in Patent No. 1,992,538 which expired on Feb. 26, 1952.

The support member 30 is rigidly connected to the cable 60 by the clamp 40 as shown in FIG. 1.

Suitable material for the support member 30 is cast aluminum alloy, cast iron, and cast magnesium alloy. Spring steel is used for the springs 10 and 11.

In FIG. 2 the axis $R_1$—$R_1$ of the spring 10 and the axis $R_2$—$R_2$ of spring 11 are substantially parallel to each other, and are also substantially perpendicular to the longitudinal axis X—X of the inertial member 50. The axis $R_1$—$R_1$ of spring 10 and the axis $R_2$—$R_2$ of spring 11 are substantially coplanar with the longitudinal axis X—X of the inertial member 50 and the longitudinal axis of the cable 60. It is also seen from FIG. 3 that the axes $R_1$—$R_1$ and $R_2$—$R_2$ lie in a plane which passes through the center of the inertial member 50, being slightly offset from the center of gravity.

As shown in FIG. 2, the distance L1 from the center of gravity CG of the inertial member 50 to the line $R_1$—$R_1$ is substantially different from the distance L2 from the center of gravity CG of the inertial member 50 to the line $R_2$—$R_2$. The distances L1 and L2 represent the distances between the center of gravity CG of the inertial member 50 and the lines $R_1$—$R_1$ and $R_2$—$R_2$, respectively.

As shown in FIG. 2, the effect of the springs 10 and 11 is nonsymmetrical with respect to a plane perpendicular to the longitudinal axis X—X of the inertial member 50 and passing through the center of gravity CG of the inertial member. This nonsymmetrical effect of the springs 10 and 11 accounts for the two resonant frequencies of this embodiment of the invention. The critical factor is neither the placement itself of the springs, nor the relative stiffnesses itself of the springs. The critical factor is moment of stiffness, that is, the product of the coefficient of stiffness of each spring and the distance of the spring from the center of gravity of the inertial member. Whenever the moments of stiffness of the two springs are unequal, there are two dependent modes of vibration in the vertical plane parallel to the longitudinal axis of the inertial member and passing through its center of gravity. But when the moments of stiffness of the springs are equal, there will be two independent modes of vibration in the same vertical plane.

Independence of vibration means that vibration may be experienced in one mode without vibration occurring in the other mode. For example, when the moment of stiffnesses for the springs in FIG. 2 are equal, the inertial member may rotate about its center of gravity without any displacement in the vertical direction of the center of gravity. Similarly, the inertial member may vibrate along a vertical axis passing through the center of gravity with no attendant rotation of the inertial member.

Dependence of vibration or interaction of two modes of vibration means that when the inertial member vibrates in one given mode, vibration in a second mode will also necessarily occur. In a case where the moments of stiffness for the two springs are unequal, there will be dependence of interaction of two modes of vibration of the damper in a vertical plane parallel to the longitudinal axis of the inertial member passing through its center of gravity. This means that whenever there is displacement of the center of gravity along a vertical axis, there will also be rotational vibration of the inertial member about its own center of gravity.

A stretched cable under a constant tension load T pounds is shown in FIG. 5a. The natural characteristic of this cable is to vibrate up and down in a plane with an amplitude having any one of a number of specific wave shapes such as that shown in FIG. 5b. The shape of such a deflection curve is sinusoidal. The cable vibrates up and down at a particular frequency between extreme positions indicated by FIGS. 5b and 5c and the deflection curve attains the configuration illustrated in FIG. 5c exactly one-half cycle after it attains the configuration shown in FIG. 5b. The deflection amplitude A depends primarily on the wind speed and the temperature of the cable and is exactly the same for each half-cycle when a steady state condition is reached. At certain points G and H along the cable, the deflection of the cable is zero and the distance between these points is half the wavelength of the vibration. These points G and H are called node points and are points at which the cable is motionless. The distance between node points is referred to as the loop length. As shown in FIG. 5b the maximum amplitude of deflection occurs halfway between node points or near the center of each loop length.

A very useful concept in the design of vibration dampers is that of mechanical impedance or dynamic mass. Dynamic mass of a cable span is defined as the force applied to the cable at any point in a vertical direction divided by the acceleration of the cable at the same point in the vertical direction. The dynamic mass varies along the length of the cable and at each point it is a function of frequency. It is obvious that as the dynamic mass increases, the force required to produce a given acceleration increases. Likewise the less the acceleration for a given force, the greater is the dynamic mass. Since the maximum amplitude of deflection occurs at points half-way along the loop length, and acceleration is largest at points of maximum deflection amplitude, these are points at which the dynamic mass or mechanical impedance of the cable is a minimum. Conversely, at points on the line near the node points, the acceleration is small and hence the dynamic mass of the line at that point is relatively large.

FIG. 6 represents the dynamic mass of a given cable span, in pounds, as a function of the position in the loop length, expressed in percent of loop length. In this graph the dynamic mass is calculated for a 1.108" diameter Drake transmission line for various resonant frequencies of the line. In the higher modes of vibration, the resonant frequency increases and the loop length correspondingly decreases. Regardless of the loop length, however, the dynamic mass of the line is much smaller near the center of the loop than at positions near the node points. The three curves F1, F2, and F3 correspond to different frequencies.

Not only does the dynamic mass of the line vary between node points, but the dynamic mass of the line at a given point on the line varies with the frequency at which the line vibrates. Since the node points change in position as the frequency of vibration changes, the dynamic mass at a given point in the line also changes. A fixed point on the line may be in the middle of a loop at one frequency, and near a node point at a different frequency. For example, if a given span of cable vibrates at such a frequency as to create a nine foot loop length, the dynamic mass at a point 4.5 feet from a clamped end of the span will be relatively small. However, as the frequency of vibration increases, the loop length becomes shorter and when the line vibrates at such a frequency as to establish a 4.8 foot loop length, the point which is 4.5 feet from the clamped end of the cable is much closer to the node point at 4.8 feet from the clamped end and the dynamic mass of the line at that point for the higher frequency is substantially larger than the dynamic mass at the lower frequency.

The graph shown in FIG. 7 represents the change in dynamic mass of a line at a given point on the line as a function of the frequency of vibration in the line. The line used for this test was a 155 foot span of 1-inch diameter Drake conductor. For the frequency range shown in this graph, the loop length was approximately 31 feet. The point at which measurements were made was 17 feet from a clamped end of the line. The point M on the graph is the point at which the dynamic mass reaches a minimum and corresponds to the point at which the line resonates. The resonant frequency is about 6.3 c.p.s. and the dynamic mass of the line at the point of measurement for this frequency is about 0.5 pound. It can be seen that as the frequency of vibration varies slightly from the resonant frequency, the dynamic mass of the line at the point of measurement increases sharply. The fact that the dynamic mass increases sharply as the frequency is varied slightly from the resonant frequency indicates that the acceleration of the line, and also its deflection, in a vertical plane is reduced sharply. Since the acceleration in the line is reduced sharply as the frequency departs slightly from the resonant frequency, damping is not necessary at such nonresonant conditions. This graphic representation R is indicative of the manner in which the dynamic mass of a line at a point varies when the frequency of vibration is changed slightly from the resonant frequency. The graph S also shows how the phase difference between driving force and acceleration varies with the frequency. In effect, while the wind is blowing, large damping is required at many discrete (resonant) frequencies, and these frequencies vary as the wind speed.

This phenomenon is further borne out by typical graphs R1, R2, and R3 shown in FIG. 8. These graphs apply for a 1-inch transmission line with a 1,000 foot span under 6,000 pounds tension and weighing one pound per foot. The curves are plotted to represent the dynamic mass at a point 4.5 feet from a clamped end. Graphs S1, S2, and S3 show how the phase difference between driving force and acceleration varies with the frequency.

In the 7 to 8 c.p.s. range, the loop length is about 30 feet. As shown in the graph, at least four resonances occur between 7 and 8 c.p.s. These are indicated by the minimum values of dynamic mass. At each resonant point, the dynamic mass of the line is about 1 unit. The ordinate scale is provided with normalized units to illustrate relative values of dynamic mass. As the frequency of vibration varies slightly from any one of these four resonant frequencies, the dynamic mass of the line increases sharply. As was pointed out above, the frequencies which are slightly different than the resonant frequencies, damping is unnecessary.

In the frequency range of about 24 to 25 c.p.s. it is observed that five resonances occur. The dynamic mass of the line at the point of measurement for each of these resonances is about 0.3 unit as indicated by the points M2. The loop length in this frequency range is about 9 feet. The dynamic mass of the line at the point of measurement is smaller in this frequency range since the point of measurement (4.5 feet from clamped end) is at the center of the loop length in the frequency range of 24 to 25 c.p.s., whereas in the frequency range of 7 to 8 c.p.s. the point of measurement is less than 25% of the loop length away from a node point. In the 46 to 47 c.p.s. range, the loop length was about 4.8 feet, and the dynamic mass of the line at each resonance is between 3 and 4 units as indicated by the point M3. The dynamic mass at the resonances in this frequency range is much higher at the point of measurement than in the 24 to 25 c.p.s. range because the point of measurement (4.5 feet) is near the node point (4.8 feet). A damper applied at the point of measurement (4.5 feet) would accordingly be more effective for damping vibrations in the 24 to 25 c.p.s. range than for damping vibrations in the 46 to 47 c.p.s. range.

In order to be most effective, the dynamic mass of a damper must be large compared to the dynamic mass of the line. For this reason, to be most efficient the damper should be located away from node points in the line.

It has been determined experimentally that while effective damping may be obtained by a damper of this invention located at least 10% of the loop length away from a node point, more effective damping results if the damper is at least 25% of the loop length away from a node point. The node points corresponding to different frequencies are located at different distances along the span of the cable, except at the very ends. The driving frequency varies with wind speed as indicated on the lower scale of FIG. 8. In other words, the frequency at which vibration of the line is being forced varies as the speed of the wind changes. It is desirable to damp vibrations particularly at the resonant frequencies. As the wind speed increases, the first node point moves closer and closer to the end of the cable span. In accordance with this invention a damper having a high effective dynamic mass compared with the dynamic mass of the cable is located near one of the ends of the cable in order that it may be spaced from all possible nodes corresponding to wind speeds up to a high value likely to be encountered in the area where the cable is installed.

The graph of FIG. 9 shows how the dynamic mass of the damper of one embodiment of this invention varies as a function of the frequency of vibration. Maximum dynamic mass of the damper occurs at the damper resonance points N, Q, and R.

The extent to which a damper reduces vibrations in a line depends upon the ratio of the dynamic mass of the damper to the dynamic mass of the line at the point at which the damper is applied. If several dampers are attached along the line and their dynamic mass is 10 times as great as the dynamic mass of the line, the amplitude of vibration at that particular frequency will be reduced to about 10% of what it would be if the dampers were not applied.

In FIG. 9 it is seen that the dynamic mass of one embodiment of this invention is greater than 8 pounds up to a frequency of about 70 c.p.s. Such a damper would be effective in reducing vibrations at resonances for which the dynamic mass of the line is less than about 1 pound at the point at which the damper is applied. Thus, the vibration of the Drake line described with reference to FIG. 8 would be reduced in amplitude by at least about 80 to 90 percent at all wind speeds between about 5 m.p.h. and about 30 m.p.h. and more as indicated by the residual vibration measurements in FIG. 10, which were obtained with two dampers installed on one end of a 155-foot span.

An important advantage of the design of the present invention is that some of the characteristics of the damper may be approximated by theoretical means. The equation which applies was originally developed to define the resonant frequencies of an automobile on its springs. The importance of the applicability of the equation is that the parameters are known for a given span of cable to which the damper will be applied, the proper resonances may be designed into the damper. This reduces the amount of time necessary to determine the optimum parameters for a damper for a given span. The resonances of the damper may be designed in any combination desired in accordance with the following equation, which is discussed with reference to FIG. 4:

$$f_{1,2}^2 = \frac{g}{4\pi^2 W}\left[\frac{1}{2}\left(\frac{c}{r^2}+a\right) \pm \sqrt{\frac{1}{4}\left(\frac{c}{r^2}-a\right)^2 \frac{b^2}{r^2}}\right]$$

where:
$f_{1,2}$=resonant frequencies of damper, c.p.s.
$a = K_1 + K_2$
$b = K_2 L_2 - K_1 L_1$
$c = K_2 L_2^2 + K_1 L_1^2$
$K_1$=spring constant of one spring, lbs./inch
$K_2$=spring constant of other spring, lbs./inch
$L_1$=distance of spring $K_1$ from C.G. of mass, inches
$L_2$=distance of spring $K_2$ from C.G. of mass, inches
$g$=acceleration of gravity, 386 inches/second$^2$
$W$=mass, lbs.
$r$=radius of gyration of mass, inches The above equation indicates one resonance by the use of the minus sign and second resonance by the use of the plus sign. Using the above equation, resonant frequencies of 10.3 c.p.s. and 23.5 c.p.s. were calculated for a damper having the following parameters:

$r = 5.6$ inches
$K1 = K2 = 350$ lbs./inch
$L_1 = 0.75$ inch
$L_2 = 5.25$ inches
$a = 700$ lbs./inch
$b = 1575$ lbs.-inch
$c = 9800$ lbs.-inch$^2$
$W = 15$ lbs.

The actual resonant frequencies N and Q of the damper as seen in the graph in FIG. 9 are about 7.7 c.p.s. and 32 c.p.s. which are sufficiently close to the calculated values of 10.3 c.p.s. and 23.5 c.p.s. for the equation to be useful.

The third resonance R in the graph of FIG. 9 occurring at approximately 47 c.p.s. is not approximated by the above equation. It is believed that this third resonance is peculiar to the specific design of the damper and that this design also accounts for the fact that the actual resonant frequencies 7.7 c.p.s. and 32 c.p.s. are farther apart than the calculated values of 10.3 and 23.5 c.p.s. It will be understood that the spreading of the resonant frequencies of the damper in this manner actually helps extend the range of wind speeds for which the specific damper is effective for the cable.

If a damper of this design has three or more springs, two of the springs may be replaced by one equivalent spring. It would therefore be within the scope of this invention to include dampers with three or more springs, two of which may be replaced by an equivalent spring.

An alternate design of the damper of this invention is illustrated in FIGS. 11 and 12. The mass 100 is a hollow metal C-shaped shell which contains two U-shaped metal leaf springs 104. The springs snap onto the transmission line and the shell completely surrounds the line except for the opening 106 on the bottom. The metal springs, as shown in FIG. 11, are placed at equal distances from the center of gravity of the mass or inertial member but have substantially different stiffnesses. The metal springs may be filled with rubber sponge to provide a small amount of friction damping. However, the presence of the rubber is of very minor importance and could be eliminated without affecting the performance of the damper significantly.

From the foregoing explanation it may readily be seen that this invention provides a simple inexpensive multi-mode vibration damper which is effective for damping critical vibrations of cables over a wide range of wind speeds. It will be apparent from the foregoing description that the invention is not limited to the specific embodiments thereof illustrated, but that many changes may be made in the design of the various parts of the damper and in the materials of the various parts without departing from the scope of the invention as defined in the accompanying claims.

The invention claimed is:

1. In a device for damping Aeolian vibrations in a suspended cable:
   an inertial member,
   at least two resilient members for separately connecting said cable to said inertial member,
   the points of connection of said resilient members to the inertial member and the stiffness of said resilient members being such that the resonant frequency of free vibrations in a vertical plane parallel to the longitudinal axis of the inertial member about the center of gravity of the inertial member and the resonant frequency of free vibrations along an axis lying generally parallel to said resilient members, are different.

2. A system for damping Aeolian vibrations as defined in claim 1 in which said resilient members are helical springs.

3. In a system for damping Aeolian vibrations as defined in claim 2,
   a support member adapted to be rigidly attached to said electrical cable,
   said resilient members being attached to said support member and said inertial member by means of cylindrical holders,
   said cylindrical holders having an outer diameter slightly larger than the inner diameter of the spring to which it attaches and having a helical groove in its outer surface having a different pitch from that of the spring to which it attaches.

4. In a system for damping Aeolian vibrations in a suspended cable as defined in claim 3,
   said resilient members and said cylindrical holders being enclosed in rubber-like material having a durometer hardness between about 40 and about 70.

5. In a device for damping Aeolian vibrations in a suspended cable:
   an inertial member,
   at least two resilient members for separately connecting said inertial member to said cable, said resilient members being attached to said inertial member,
   the stiffnesses of said resilient members and the distances of said resilient members from the center of gravity of said inertial member being such that two modes of vibration in a vertical plane parallel to the longitudinal axis of the inertial member interact.

6. A system for damping Aeolian vibrations as in claim 5 in which said inertial member is mostly composed of concrete.

7. A system for damping Aeolian vibrations as defined in claim 6 in which a longitudinal reinforcing rod is contained within said inertial member,
   said longitudinal reinforcing rod being electrically insulated from other conductive components of the system.

8. In a device for damping Aeolian vibrations in a suspended cable:
   an inertial member,
   first and second resilient members attached to said inertial member for separately connecting said inertial member and said cable,
   the stiffnesses of said first and second resilient members and the distances of said first and second resilient members from the center of gravity of said inertial member being such that the product of the coefficient of stiffness of said first resilient member and its distance from said center of gravity is different from the product of the coefficient of stiffness of said second resilient member and its distance from said center of gravity.

9. A system for damping Aeolian vibrations as in claim 8 in which the stiffnesses of said first and second resilient members are such that the static weight of the inertial member stretches neither resilient member more than 0.05 inch.

10. In a system for damping Aeolian vibrations in a suspended cable:
    an inertial member,
    first and second resilient members,
    means for attaching said first and second resilient members along separate paths to said cable and to said inertial member,
    the distance between the center of gravity of the inertial member and said first resilient member being different from the distance between the center of gravity of the inertial member and said second resilient member,
    the distance from said center of gravity to said first resilient member being a small fraction of the longitudinal length of said inertial member,
    the distance from said center of gravity to said second resilient member being substantially greater than the distance from said center of gravity to said first resilient member,
    the coefficients of stiffness for said first and second resilient members being substantially the same.

11. In a device for damping Aeolian vibrations in a suspended cable:
    a clamp member comprising a rigid support member and also comprising gripping means for locking said clamp on a cable;
    an inertial member;
    two separate cylindrical anchor members attached by threading to two spaced points thereof, two additional cylindrical anchor members secured to said inertial member and extending upwardly therefrom in alignment with said first-mentioned anchor members;
    a pair of coil springs, each being threadably secured to the other surfaces of oppositely positioned anchor members;
    the helix of said threading and the helix of said springs being of opposite handedness.

12. In a device for damping Aeolian vibrations as defined in claim 11 wherein the moment of stiffness of said two springs about the center of gravity of said inertial member are different.

13. In a device for damping Aeolian vibrations in a suspended cable:
an inertial member,
at least two resilient members for connecting said inertial member to said cable,
the points of connection of said resilient members to the inertial member and the stiffness of said resilient members being such that the torque moments of the resilient members about the center of gravity of the inertial member are different whereby vibration of the inertial member and the springs is characterized by two different resonant frequencies in response to forces applied thereto in a direction transverse to the length of the cable to which it is connected.

14. In a device for damping Aeolian vibrations in a suspended cable:
an inertial member,
a support member rigidly attached to the cable,
first and second resilient members for separately suspending said inertial member from said support member,
said support member being directed generally perpendicular to the cable and to the horizontal axis of the inertial member,
the points of connection of said resilient members to the inertial member and the stiffness of said resilient member being such that the torque members of the resilient members about the center of gravity of the inertial member are different whereby vibration of at least two modes of vibration of different resonant frequencies may be excited when said cable vibrates in a vertical direction.

References Cited

UNITED STATES PATENTS

| | | | |
|---|---|---|---|
| 2,494,358 | 1/1950 | Rostoker | 174—42 |
| 3,321,569 | 5/1967 | Taylor | 174—42 |

LARAMIE E. ASKIN, *Primary Examiner.*

U.S. Cl. X.R.

188—103